(12) United States Patent
Ramakrishnan

(10) Patent No.: US 9,141,560 B2
(45) Date of Patent: Sep. 22, 2015

(54) MULTI-LEVEL STORAGE APPARATUS

(75) Inventor: Siva Ramakrishnan, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 281 days.

(21) Appl. No.: 13/538,211

(22) Filed: Jun. 29, 2012

(65) Prior Publication Data

US 2014/0006684 A1    Jan. 2, 2014

(51) Int. Cl.
*G06F 12/12*     (2006.01)
*G06F 12/16*     (2006.01)
*G06F 9/00*      (2006.01)
*G06F 12/06*     (2006.01)
*G06F 12/08*     (2006.01)

(52) U.S. Cl.
CPC .... *G06F 12/16* (2013.01); *G06F 9/00* (2013.01); *G06F 12/0646* (2013.01); *G06F 12/128* (2013.01); *G06F 12/0897* (2013.01); *G06F 2212/1028* (2013.01); *G06F 2212/1044* (2013.01)

(58) Field of Classification Search
CPC ........... G06F 8/454; G06F 9/00; G06F 12/16; G06F 12/0646; G06F 12/0897; G06F 12/128; G06F 2212/1044

USPC .......... 711/102, 163, E12.007, E12.103, 101, 711/117, 2, 115; 257/E27.122; 709/216
See application file for complete search history.

(56) References Cited

U.S. PATENT DOCUMENTS

| 2002/0099912 A1* | 7/2002 | Nakamura et al. ............ 711/119 |
| 2009/0083562 A1* | 3/2009 | Park et al. ..................... 713/323 |
| 2009/0164722 A1* | 6/2009 | Lee et al. ....................... 711/115 |
| 2009/0182947 A1* | 7/2009 | van Riel ......................... 711/129 |
| 2011/0153983 A1* | 6/2011 | Hughes et al. ................... 712/22 |
| 2011/0307674 A1* | 12/2011 | Ryu et al. ....................... 711/162 |

* cited by examiner

*Primary Examiner* — Yong Choe
*Assistant Examiner* — Shane Woolwine
(74) *Attorney, Agent, or Firm* — KED & Associates, LLP

(57) ABSTRACT

A multi-level storage apparatus includes a first-level storage area to store first information, a second-level storage area to store second information, and a selectively enabled third-level storage area to store information based on different operational states. The third-level storage area stores the first information from the first-level storage area when the third-level storage area is to change from a first state to a second state. The first information in third-level storage area is transferred to the first-level storage area when the third-level storage area is to change from the second state to the first state. The first information is to include page miss information.

18 Claims, 7 Drawing Sheets

MULTI-LEVEL STORAGE APPARATUS

FIELD

One or more embodiments described herein relate to storing information.

BACKGROUND

The introduction of data tablets seeks to meet consumer demand for a variety of applications. One type of tablet provides multi-functionality in a single device by providing a screen that operates in tablet and computer modes. Another type of tablet connects to a computer through an external port. These tablets have drawbacks, not the least of which relates to insufficient memory resources which introduces delays and serves as a limitation on performance.

DETAILED DESCRIPTION

Figure 1:
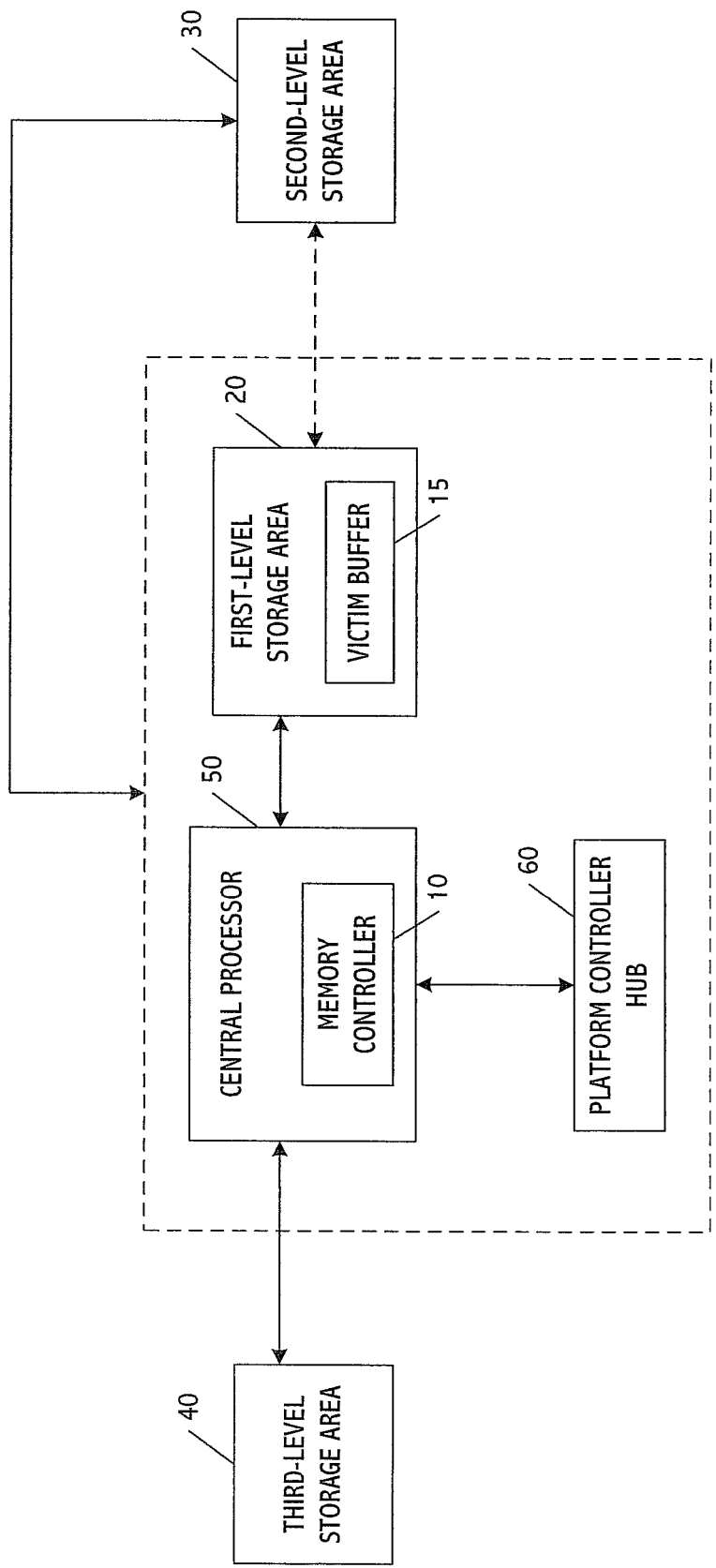
FIG. 1 shows an embodiment of a multi-level storage apparatus.

FIG. 1 shows one embodiment of a multi-level storage apparatus for use in a computing system. The apparatus includes a memory controller 10 for controlling the storage of information among three levels of storage areas arranged according to a predetermined hierarchy. Under certain conditions, information is transferred between or among these storage areas to reduce delays or to otherwise improve performance of the computing system. Moreover, at least one storage-area level may be selectively activated and deactivated to improve the scalability of the computing system in various modes of operation. The storage areas may be memory storage areas or storage areas in buffer, registers, or other devices capable for retaining data.

The storage areas include a first-level storage area 20, a second-level storage area 30, and a third-level storage area 40. The first- and third-level storage areas may serve as near memory areas and the second-level storage area may serve as a far memory. Near and far memories may be classified, for example, based on their proximity or relationship to a central processor, their data-access latency times, and/or their visibility to the operating system.

According to one arrangement, a near memory may be considered to be a cache, buffer or other type of storage area included with (e.g., on the same node as) the central processing unit. This is the case with storage areas 20 and 40 which are shown coupled to central processor 50. A near memory may also be considered to have a relatively low latency in terms of data access time and may be considered invisible to the operating system.

A far memory maybe considered to be a storage area that is located on a node different from the central processor. This is the case with storage area 30 which is shown to be coupled on a node different from central processor 50. A far memory may also be considered to have relatively high latency in terms of data access time and may be visible to the operating system.

The first-level storage area may correspond to or be included in a dynamic random access memory (DRAM) cache which has relatively high bandwidth and which serves as a near memory in the system. As a near memory, the first-level storage area may be invisible to the operating system implemented by central processor 50. The central processor may include or perform the functions of the memory controller (as shown) or the memory controller may be provided separately from the central processor.

The first-level storage area may also include or operate as a victim buffer 15 for purposes of transferring information during different modes of operation. A victim buffer is a type of write buffer that may be used to hold date written back from a cache, and thereby serves to free the cache (in this case other portions of the first-level storage area) for other uses. The victim buffer, therefore, may serve as a type of temporary back-up storage.

In accordance with one implementation, the victim buffer may be formed from a predetermined amount of space in the first-level near memory 20. This predetermined space may correspond, for example, to 256 kilobytes in the first-level near memory (or alternatively may be provided in a last-level cache (LLC)) and may be allocated for storing first-level near-memory page misses. Use of the victim buffer for this purposes allows for exclusive use of the third-level near memory as temporary storage, and also may alleviate the formation of a bottleneck in waiting for a chosen page for replacement to be written into the third-level near memory, before a desired page can be brought in from the third-level near memory to the first-level near memory.

The second-level storage area 30 may correspond to or be included in a non-volatile memory which has relatively low bandwidth and which serves as a far memory in the system. As a far memory, the second-level storage area may be visible to the operating system. Depending on the operational mode, the first-level storage area may store working sets of various applications in low latency, while allowing the second-level storage area to provide most of the needed memory capacity for power reduction with higher latency.

The third-level storage area 40 may correspond to or be included in another DRAM cache which has relatively high bandwidth and which serves as another near memory in the system. The inclusion of the third-level storage area allows the first-level storage area to be scalable (expanded or contracted) when switching between modes of the computing system. The bandwidth of the third-level storage area may be set to be low, medium, or high relative to the first- and second-level storage areas.

In accordance with one embodiment, the inclusion of the third-level near memory storage area also allows the computing system to transition between or among different modes without requiring a reboot operation to be performed. This may have the effect of significantly reducing transition time between modes. Moreover, avoiding the use of the second-level far memory as a temporary storage area for the first-level near memory (i.e., avoiding scaling of the far memory), in favor of using the third-level near memory for this purpose, increases the effective capacity without sacrificing performance in the computer mode.

In FIG. 1, the first-level storage area and victim buffer are shown as being included on a same chip or package as the central processor and memory controller. (A platform controller hub 60 may also be included on this chip or package in order to handle data transfers between the computing system and a peripheral device or information coupling). In other embodiments, the third-level storage area may be included on-chip/package.

Also, the first- and third-level storage areas are shown as being separate or exclusive from one another. This may be suitable for some applications for purposes of increasing memory capacity expansion. In other embodiments, the first- and third-level storage areas may be included in a same cache located on- or off-chip/package.

The multi-level storage apparatus may be used in a variety of applications, including to support transitions between different operating modes of an information system without requiring reboot of the terminal and/or in an otherwise virtually user-transparent manner.

Figure 2:
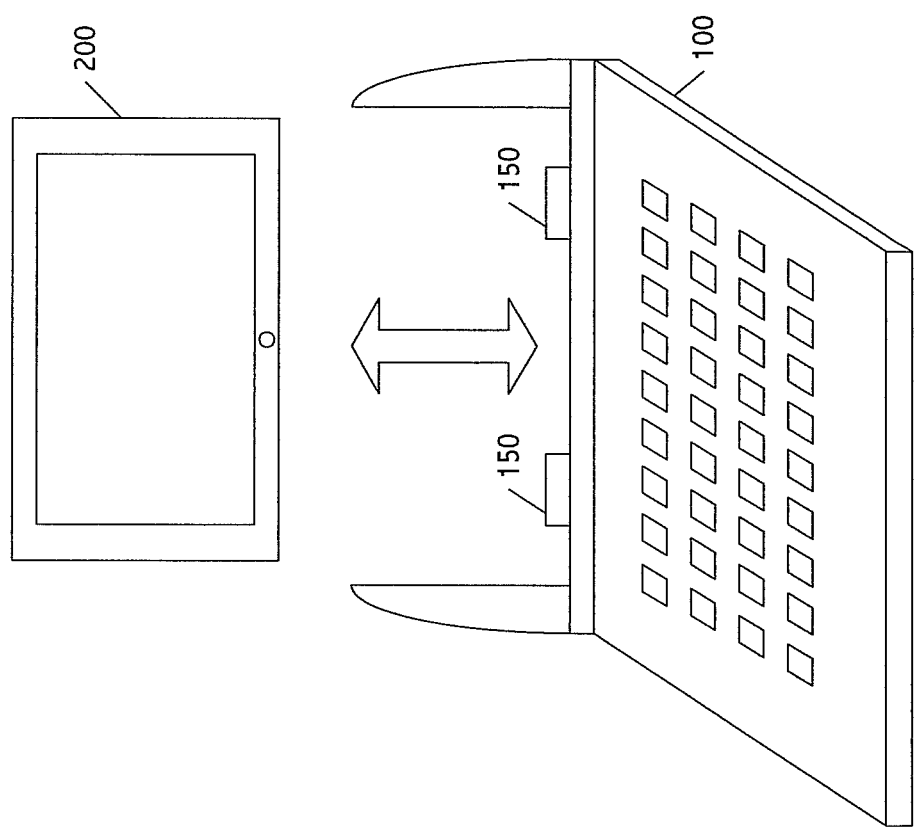
FIG. 2 shows an embodiment of an information system that includes the multi-level storage apparatus of FIG. 1.

FIG. 2 shows one type of information system that includes a computer 100 capable of being removably connected to an electronic data tablet 200. The computer may be a notebook, laptop or desktop computer or may be any one of a number of mobile devices or even another tablet. The tablet may be a pad-type device, a detachable computer tablet, or even a smart phone or other device equipped with wireless mobile communication capability. The devices may be connected by one or more interfaces 150.

The ability to removably connect the tablet to the computer allows the computer to be scalable along with its applications. This serves to enhance functionality to, for example, various gaming, graphics, and/or data management applications that might not otherwise be functioning well on the tablet. When the tablet is disconnected, the tablet may be considered to operate in tablet mode. When attached, the tablet may be considered to operate in computer mode serving as a screen for the computer. The tablet may or may not retain at least partial functionality in the tablet mode when connected.

Figure 3:
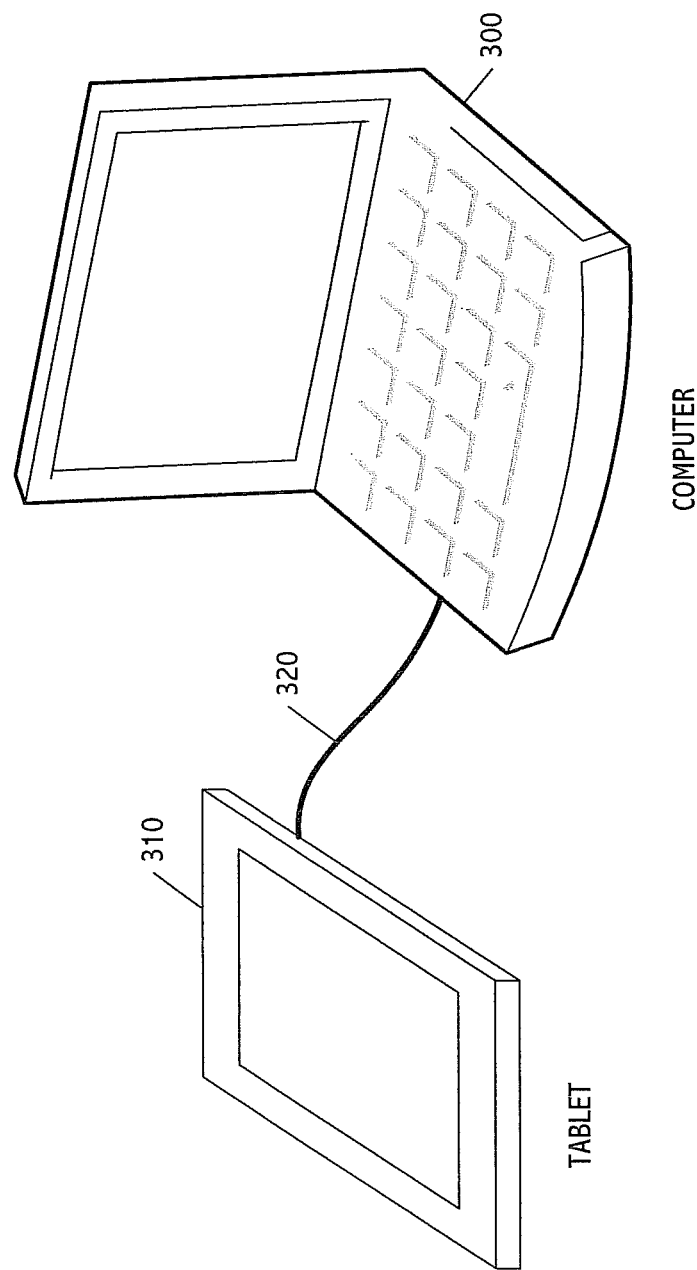
FIG. 3 shows another embodiment of an information system that includes the multi-level storage apparatus of FIG. 1.

FIG. 3 shows another embodiment in which a computer 300 and tablet 310 are connected by an interface 320 which, for example, may be a Direct Media Interface (DMI), one of a plurality of peripheral component interconnect standards including but not limited to PCI, PCIe or PCI-X, or a combination thereof. Alternatively, the computer and tablet may be connected through a wireless interface such as but not limited to one that adheres to a protocol that operates based on a Bluetooth or wireless fidelity (WiFi) standard.

According to another arrangement, the screen of the computer may swivel or otherwise move into different positions. In a first position, the screen may have a standard location in computer mode. In another position, the computer may move to an overlapping position over the keyboard to serve as a tablet. A switch or other circuit may be used to determine the position of the screen, to thereby control operation of the computer in the computer and tablet modes.

In these embodiments, the tablet may communicate with the computer based on a suitable protocol such as, for example, a direct media interface (DMI) standard, one of a plurality of peripheral component interconnect standards including but not limited to PCI, PCI extended (PCI-X) or PCI express (PCIe), or a combination thereof. Also, in the aforementioned embodiments, switching between computer and tablet modes may require a number of management functions to be performed. These functions may be performed relative to a peripheral component interconnect space, which defines which devices are currently connected (wirelessly, port connections, or otherwise) to the computer. These devices and/or the computer itself may be referred to as PCIe devices.

More specifically, in addition to memory-mapped and input/output (I/O) port spaces, each device or device function connected as a peripheral to the computer may be considered to have a configuration space, as well as the computer itself. Each space may correspond to a predetermined number of bytes that are separately addressable. The address of the configuration space of each device may correspond to a bus address or a link-based point-to-point interconnection address.

In a typical scenario, the computer may have a plurality of connected peripheral (e.g., PCIe) devices. If the peripheral component interconnect space is rescanned every time a mode change occurs (e.g., computer mode to tablet mode, or vice versa), delays may be introduced which may prove inconvenient to a user. These delays may only be increased if plug-and-play (PnP) initializations are also required to be performed for each mode change. The delays could be at least hundreds of milliseconds or more for each device.

Figure 4:
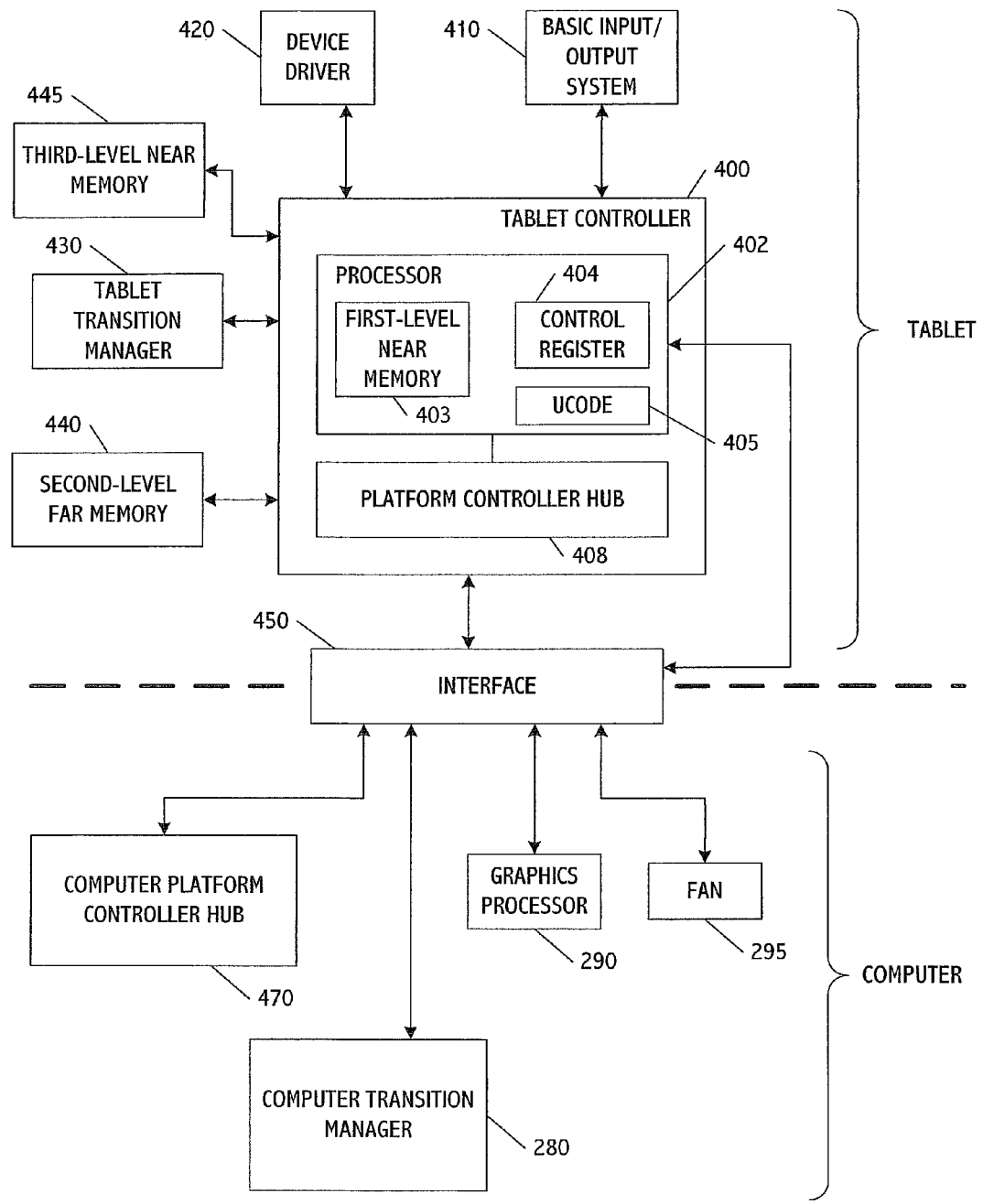
FIG. 4 shows an embodiment of an internal configuration of the information system in FIG. 2 or 3, which embodiment includes a multi-level storage apparatus.

FIG. 4 shows a scalable computing platform which may correspond to any of the aforementioned embodiments of the computer and tablet. In this illustrative embodiment, the tablet operates in tablet mode and computer mode. The tablet operates in a first (tablet) mode when disconnected from the computer and operates in a second (computer) mode when connected to the computer. The tablet and computer may have separate housings or housings that are designed to be coupled to one another.

The tablet is connected to the computer through an interface 450 which, for example, may include one or more pins and/or signal lines. In one embodiment, the interface may include one or more DMI lines for communicating data with the computer. In other embodiments, the interface may include or be coupled to an electro-thermal connector. In other embodiments, the interface may be a wireless interface.

The tablet includes a controller 400, a basic input/output system (BIOS) 410, one or more device drivers 420, and a tablet transition manager 430. Also includes is a multi-level storage apparatus which, for example, may correspond to one or more of the aforementioned embodiments.

The controller includes or is coupled to a processor 402 and a platform controller hub (PCH) 408 for managing communications with the computer and its peripheral devices and/or peripheral devices coupled directly to the tablet. The controller may be a system-on-chip (SoC) or silicon-on-package (SOP) or may have a different arrangement.

The peripheral devices may be located in or coupled to the computer or tablet through corresponding ports, and the peripherals may communicate and exchange data with the tablet through one or more peripheral component interconnect (PCI)-type protocols. These protocols include but are not limited to the so-called PCI expanded (PCIe) protocol.

The processor 402 may control overall operations of the tablet and includes an address decoder for mapping configuration I/O addresses for storage into a memory of the tablet. According to one embodiment, the processor includes or is coupled to a first-level near memory 403, a control register having one or more bits 404, and a storage area 405 for storing control software.

The control register 404 includes one or more bits for controlling data transfers within and/or activation of one or more of those storage areas of the multi-level storage apparatus during tablet and display modes.

The storage area 405 may store microcode (ucode) for performing one or more control operations relating to operation of the multi-level storage apparatus. According to one embodiment, the ucode controls the processor to perform page-level operations based on supporting table structures. New code may be added for modified page walk for assigning three-level memory page table extensions. These extensions may be used in connection with a tag table, where extensions include tags identifying one or more of the near memory caches in the tablet.

These and other ucode operations may be performed during at least the computer mode. Because near-memory cache replacement may be performed at the page level, the ucode may assist in performing these memory transfer operations.

The platform controller hub 408 may include logic (hardware and/or software) for a platform sync agent within or coupled to the hub. The platform sync agent may provide logic to enable faster switching between the computer and tablet modes.

The BIOS 410 may program or otherwise configure address mapping registers in the address decoder for mapping the PCIe device and/or root port configuration address block to corresponding memory address blocks. Additionally, the system BIOS may program the default memory management/hierarchy to use of three storage-area levels in computer mode or during start-up or booting of the computer, and to use two of the three storage-area levels in tablet mode and during boot operations that might occur during tablet mode.

The device driver 420 may control the flow of information between the computer and tablet and/or other devices. When the tablet is disconnected from the computer (e.g., when in tablet mode), the device driver may block all input/output information at this time.

The tablet transition manager 430 may manage transition of the tablet to and from the tablet mode when the tablet is respectively disconnected from and connected to the computer. In accordance with one embodiment, the tablet transition manager may program a machine state register (MSR) for initiating or otherwise controlling configuration space management operations, and/or for performing other transitional operations as the tablet switches between computer and tablet modes The tablet transition manager may be implemented in firmware or firmware and hardware.

The tablet transition manager may be stored in a flash system-on-chip (Flash-SoC) memory. This memory may provide a partition for tablet firmware and computer firmware, to thereby enable faster switching between computer and tablet modes.

The multi-level storage apparatus includes the first-level near memory 403, a second-level far memory 440, and a third-level near memory 445. The transfer of information between and among these memories may be performed under control of the processor 402 based on the one or more bits set in the control register 404 and the ucode in storage area 405. This information transfer may also be performed in conjunction with transition operations to be performed by the tablet transition manager.

The first-level near memory 403 may operate as a low latency, low power DRAM cache which stores working sets of various applications and/or other information depending upon the operating mode of the tablet. The first-level near memory may correspond to or include a victim buffer for storing page misses for the first-level near memory and/or other information when the tablet is operating in computer mode. In tablet mode, modified contents of memory 403 and/or the victim buffer is transferred to memory 445 during cache information replacement operation. As a near memory, memory 403 may be invisible to the tablet operating system.

The second-level far memory 440 may correspond to or be included in a non-volatile memory which has relatively low bandwidth and high latency. As a far memory, second-level far memory 440 may be visible to the operating system. When operating in tablet mode, the first-level storage area may store working sets of various applications in low latency, while allowing the second-level storage area to have enhanced memory capacity.

The third-level near memory 445 allows the first-level near memory to be scaled when the tablet switches between tablet and computer modes. In accordance with one embodiment, the first-level near memory transfers the contents of the victim buffer to the third-level near memory when the tablet changes from computer mode to tablet mode, i.e., when the tablet is to be disconnected from the computer. The contents of the victim buffer may include information indicative of first-level near memory page misses.

When changing from tablet mode to computer mode, the combination of first level near memory and third level near memory expands the total memory capacity for the computer mode applications hence providing the necessary capacity for the computer mode applications. Thus, when operating in computer mode, inclusion of the third-level near memory enables the capacity of the first-level near memory to be expanded.

Moreover, because the first-level near memory has lower latency (faster speed) with sufficient capacity for tablet mode applications, removal of third level near memory may allow for lower system power and improved battery life for tablet mode usages for some applications.

When changing from tablet mode to computer mode, the information stored in the third-level near memory is transferred back into the first-level near memory or victim buffer. In accordance with one embodiment, the third-level near memory may be a low power double data rate (LPDDR) DRAM cache with medium to high bandwidth, medium to low latency and low power consumption compared, for example, to the second-level far memory. In other embodiments, a different type of memory or cache may serve as the third-level near memory.

When switching between the aforementioned modes, inclusion of the third-level near memory allows the tablet to remain in operation without the need to take the computer system and its running applications offline to resize or remove near memory and/or with requiring a reboot operation to be performed for the computer or tablet. Switching between modes, therefore, may be accomplished much more quickly, using much less power, and in a manner virtually transparent to the user compared with systems that do not perform memory resize or removal in accordance with the embodiments described herein.

The embodiments described herein that include use of the third-level near memory may also allow other equipment manufacturers flexibility to implement one-level memory hierarchy using the capacity of the off-chip third-level near memory. This may serve to mitigate non-volatile memory supply risks, for use in applications other than scalable computing systems.

Referring again to FIG. 4, the computer has a platform controller hub (PCH) 470, a computer transition manager 280, a graphics processor 290, and a fan 295. The PCH 470 manages the transfer of information and commands through the connector and thereby serves to expand the I/O functionality of the computer platform. The PCH also runs firmware stored in the computer transition manager 280. This firmware manages the transition of the computer based on whether or not the tablet is attached.

Figure 5:
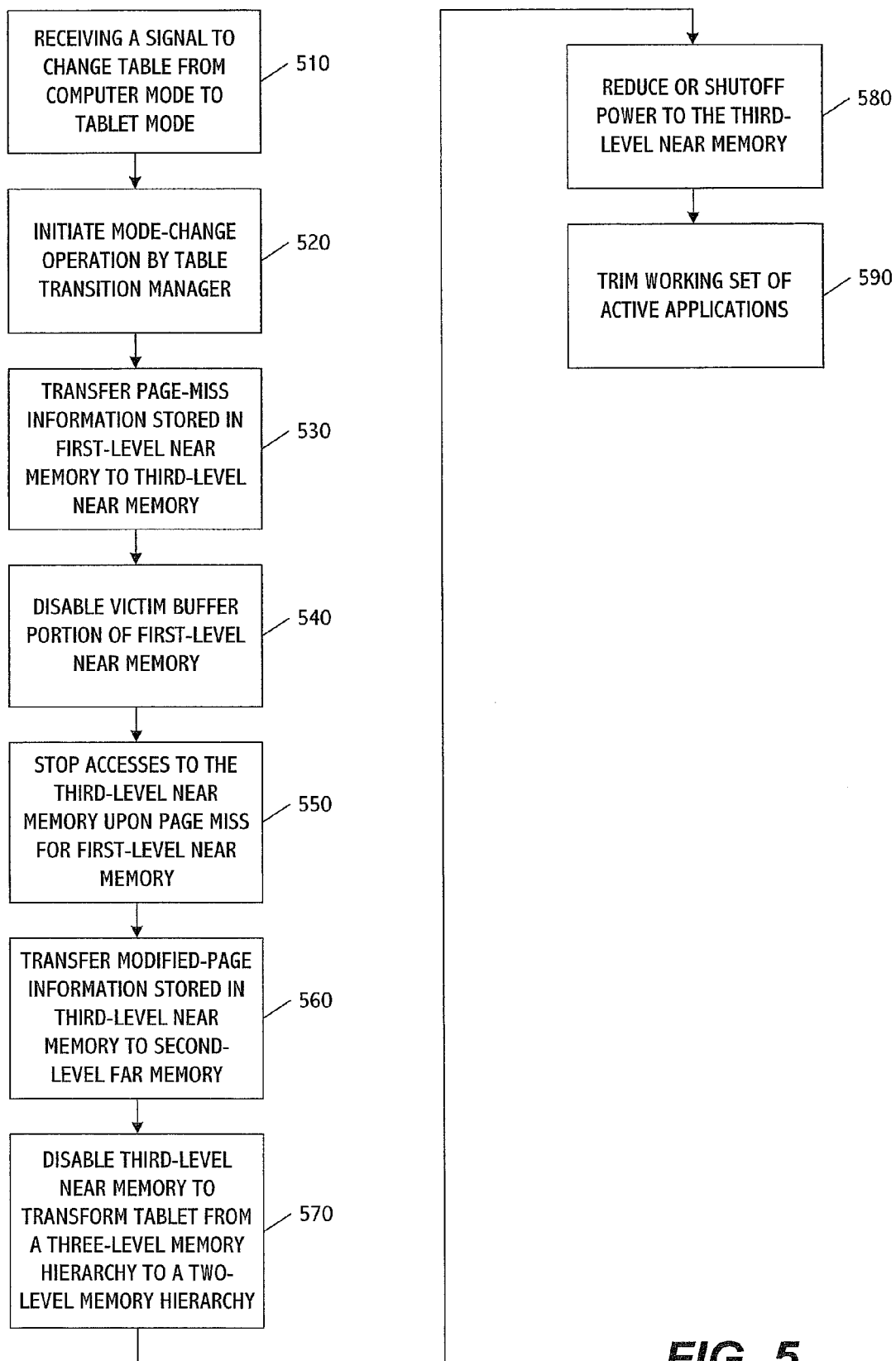
FIG. 5 shows operations included in one embodiment of a method for controlling a tablet when changing from computer mode to tablet mode.

FIG. 5 shows operations included in one embodiment of a method for controlling a tablet when changing from computer mode to tablet mode. The tablet may be the ones shown in FIGS. 2, 3, and/or 4 or may be a different tablet. For illustrative purposes, it will be assumed below that the tablet has the internal configuration shown in FIG. 4.

An initial operation includes receiving a signal indicating that the tablet is to switch from computer mode to tablet mode, e.g., that the tablet is to be disconnected from the computer. (Block 510). This signal may be generated after receiving a user request signal entered from an input device of the computer. Such a signal may be generated, for example, by selecting a displayed menu option, by pressing a predetermined key, or by another method.

After the signal is received by the tablet controller, the controller may activate the tablet transition manager 480 to initiate execution of a mode change operation. (Block 520). During this operation, the tablet transition manager sends a signal to processor 402 to initiate transfer of information stored in the first-level near memory 403 to the third-level near memory 445. (Block 530). In one embodiment, the content of the victim buffer includes page miss information.

In performing this operation, the entire contents of the first-level near memory may not be transferred to the third-level near memory. Rather, if the victim buffer is included as a predetermined range of memory locations in the third-level near memory, then the processor would interpret the signal from the tablet transition manager as an instruction to transfer only the contents in the victim buffer to the third-level near memory. In other embodiments, the entire contents of the first-level near memory may be transferred to the third-level near memory.

In accordance with one embodiment, after the contents of the victim buffer is transferred to the third-level near memory, the only remaining contents in the first-level near memory may be the unmodified contents of the first-level near memory. In other embodiments, additional or other information may remain or be stored.

Once the transfer has been completed, the processor may generate a signal to disable the victim buffer, for example, by setting one or more control bits for the first-level near memory, in the event that the victim buffer is included in the first-level near memory. (Block 540).

In a next operation, the tablet transition manager controls the processor to stop accesses to the third-level near memory when a page miss occurs in relation to the first-level near memory. (Block 550). In accordance with one embodiment, a page miss may refer to a condition under which memory information referred to as a page is missing from a certain level of memory storage and therefore has to be brought from another storage such as a disk drive.

In a next operation, the tablet transition manager initiates a flush operation to transfer all of the modified pages in the third-level near memory for storage into the second-level far memory 440. (Block 560). The transfer may be performed under control of the processor. The transferred information may pass through the processor or the infatuation may be transferred along a path that bypasses the processor, including a path that directly connects the second-level far memory and the third-level near memory. (In accordance with one embodiment, a modified page may refer to memory information (referred to as a page) in which some portions of this information have been written to or modified by a processor).

When the flush operation for the third-level near memory has been completed, the tablet transition manager sets one or more bits in control register 404 to disable the third-level near memory. (Block 570). Disabling this memory causes the tablet to transition from a three-level memory hierarchy to a two-level memory hierarchy based on the remaining active-level memories, i.e., based on the first-level near memory and the second-level far memory which remain active for use in tablet mode.

In accordance with one embodiment, the third-level near memory may be disabled simply by setting a logical 0 bit in control register 404. Setting this bit enables a Page Miss Handler to treat future accesses as two-level memory accesses, so that all future first-level near memory misses will be stored in the second-level far memory instead of in the third-level near memory (which has now been disabled).

The Page Miss Handler may be implemented by logic in the tablet controller. In accordance with one embodiment, the Page Miss Handler may include stored instructions for guiding the processor to perform memory management operations including address translations and the detection and processing of page misses and page hits during a memory access operation. The stored instructions may included in the microcode in storage area 405. Moreover, the Page Miss Handler may perform these operations, for example, based on page invalid indications stored in a translation lookaside buffer (TLB) which may cache linear to physical address translations.

A page hit may be considered to have occurred if the linear and/or physical address is detected in cache, or when a memory page request is received to a physical page that this in an active (e.g., "hot") region of a memory or a memory has is currently active. A page miss may be considered to have occurred if the linear and/or physical address are not cached, or a memory page request to a physical page that is in an inactive (e.g., "cold") region of a memory or a memory which has been deactivated or has been flushed to a storage device such as a disk drive or solid-state drive (SSD).

When a page miss is detected, the Page Miss Handler may perform a page table walk to determine the physical address that corresponds to linear address. The page walk may include performance of an address lookup operation in one or more page tag tables stored in the first-level near memory, storage area 405 or another storage area. The use of page tables may provide for a potentially transparent way of splitting memory management between the first-level near memory and the second-level far memory when the tablet is operating in tablet mode.

More specifically, when the tablet controller (or processor) receives a memory request from the tablet operating system, the memory request may include a linear memory address. This linear memory address is not the actual physical address of the requested memory location, but rather an address utilized by the operating system. To determine the actual physical address when a page miss occurs, processor logic takes the linear address and performs a walk through memory page tables to find the physical address of the page. This physical address may be referred to as a Page Physical Address (PPA).

The processor logic may include the Page Miss Handler previously described. When a page miss occurs, the Page Miss Handler may access a tag table, which contains information corresponding to the PPA in an indexed form.

Figure 6:
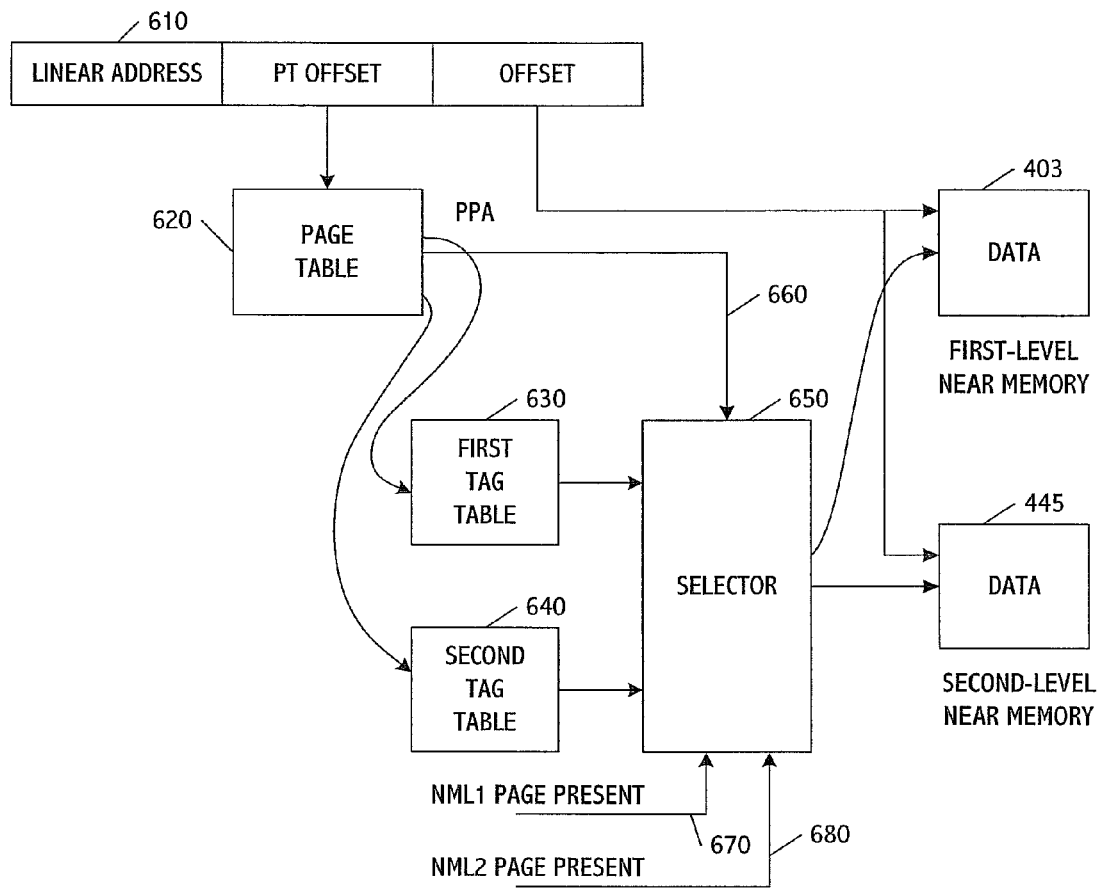
FIG. 6 shows one embodiment of a page walk operation.

FIG. 6 shows one embodiment of how Page Miss Handler logic, implemented, for example, by processor 402, may execute a memory access request for storing data in the first-level near memory or third-level near memory.

As shown in FIG. 6, a memory access request received by the Page Miss Handler includes a linear address 610 corresponding to a location where data is to be written or read. The linear address may include page table offset information and/or an offset value. A page table offset may refer to an entity used to locate a smaller subset of a page such as 64 bytes (page sizes could 4 KB, 8 KB or even 1 MB). It is a pointer to a smaller amount of data within the page.

In accordance with one embodiment, offset bits may be used to locate a smaller portion of the data in the memory page. When both the third- and first-level near memories are enabled in computer mode, the offset may be used by both of the memories to return the data corresponding to the specific set of bytes requested within the page. Also, when tablet mode is enabled, only the first-level near memory is enabled and hence the offset may be used by the first-level near memory only to obtain the correct data from memory page and return it to the processor. Under control of operating system (OS) instructions (e.g., ucode in storage device 405), a search may be performed to locate the linear address in a page table (PT) 620.

When a physical address translation is not found in the TLB, a page walk may be performed by the ucode to obtain the linear-to-physical translation from the page table. The usual page table contains a direct translation from linear address to page physical address of the OS-visible memory. However, in the case of two- or three-level memory subsystems, the near memory levels may not be OS-visible and hence may require an additional level of translation from the OS-visible page physical addresses to near memory addresses.

This may be accomplished by providing additional tag tables. The PPA may be used to index into the tag table to obtain the near memory page address. The first Tag Table 630 is assigned to store information corresponding to physical addresses in the first-level near memory. The second Tag Table 640 is assigned to store information corresponding to physical addresses in the third-level near memory.

Another logic (selector 650) selects to receive the output of one of the tag tables based on the operational mode of the tablet. A first control signal 660 may have a first value when the tablet is in tablet mode and a second value when the tablet is in computer mode.

When in tablet mode, the third-level near memory 445 is disabled and only the first-level near memory and second-level far memory are active 440. Accordingly, the first control signal sets the selector to receive page addresses from the first Tag Table and memory accesses may be performed for the first-level near memory but not second-level near memory 445.

When in computer mode, all three memories are enabled. The first control signal sets the selector to receive page addresses from both tag tables for performing memory accesses to both near memories. In order to determine which near memory to access, second and third control signals 670 and 680 control signals are input into the selector. The first control signal is input into the selector to cause the selector to select the first Tag Table when the Page Physical Address corresponding to the logical address in the memory access request is found in the first Tag Table.

The second control signal is input into the selector to cause the selector to select the second Tag Table when the Page Physical Address corresponding to the logical address in the memory access request is found in the second Tag Table. The operation associated with the memory access request (e.g., a memory read or write operation) is performed to store or retrieve data from a corresponding one of the near memories based on the physical address received by the selector.

Returning to FIG. 5, after the third-level near memory has been disabled in Block 570, the tablet transition manager controls the one or more voltage regulator (VR) controllers to reduce or shut off power to the third-level near memory. (Block 580). An optional operation of enabling the tablet processor to trim the working set of active applications may be performed in attempt to improve management of information transfers between the first-level near memory and the second-level far memory in tablet mode. (Block 590). The processor may perform this operation, for example, under control of the tablet operating system.

Figure 7:
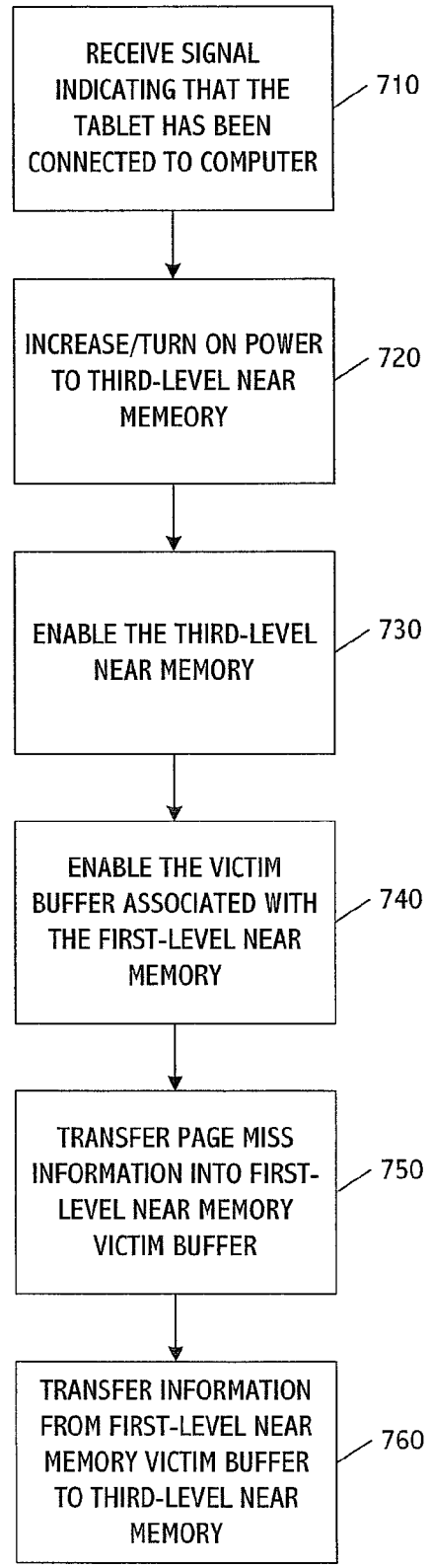
FIG. 7 shows operations included in one embodiment of a method for controlling a tablet when changing from tablet mode to computer mode.

FIG. 7 shows operations included in one embodiment of a method for controlling a tablet when changing from tablet mode to computer mode. This method may be performed after the method explained with reference to FIG. 5 is performed or following a different method. At the beginning of this method, the tablet is operating based on a two-level memory hierarchy that is to be changed to a three-level memory hierarch by re-activation of the third-level near memory.

An initial operation includes receiving in the tablet a signal indicating that the tablet is to switch from tablet mode to computer mode. (Block 710). This signal may be generated, for example, when a detector detects that the tablet has been connected to the computer. The detector generating the signal may be located in the computer or tablet.

After the detection signal is received, the tablet transition manager controls one or more voltage regulator controllers to increase or turn on power to the third-level near memory. (Block 720). This powering operation may cause the third-level near memory to perform an initialization operation for purposes of handling memory access requests and associated read and write operations.

In another operation, the third-level near memory is enabled to allow the tablet to operate based on a third-level memory hierarchy. (Block 730). Also, the victim buffer associated with the first-level near memory is enabled. (Block 740). As previously indicated, the victim buffer may corresponding to a predetermined range of memory locations in the first-level near memory or may be coupled to this near memory.

In another operation, the processor transfers page miss information (e.g., so-called "victims") to the victim buffer associated with the first-level near memory. (Block 750). The page miss information may be the information stored in the third-level near memory in operation 530 in FIG. 5 and/or new page information generated after full power has been re-supplied to the third-level near memory. The operation in Block 750 may be performed based on instructions in the ucode in storage area 405 or based on other stored instructions. The third-level memory hierarchy may effectively increase the capacity of the first-level near memory in computer mode by storing information that otherwise might be stored only in the far memory.

In another operation, modified lines and/or other information in the first-level near memory victim buffer are transferred for storage into the third-level near memory. (Block 760). Again, these operations may be performed based on instructions in the ucode. The operation in Block 760 may be performed before, after, or during the operation in Block 750.

In another operation, the tablet transition manager sets one or more bits in control register 404 to enable the processor (including, for example, the logic of the Page Miss Handler) to enable page walks to be performed for subsequent first-level near memory misses.

In accordance with another embodiment, a non-transitory computer-readable medium stores instructions for controlling storage of information in accordance with any one of the aforementioned embodiments. The computer-readable memory may be a read only memory, a random access memory, flash memory, or any other type of memory capable of storing instructions including firmware, middleware or other forms of software.

According to one application, the medium may store first code to store first information in a first storage area and second code to selectively enable a second storage area to store information based on different operational states. The second storage area may store the first information from the first storage area when the second storage area is to change from a first state to a second state. The first information may be transferred from the second storage area to the first storage area when the second storage area is to change from the second state to the first state.

The first information may include page miss information and/or other information including but not limited to other types of page information. The page miss information may be stored in a first range of locations in the first storage area and the first range of locations may correspond to a victim buffer. The first state may be an enabled state and the second state may be a disabled state.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Also, the features of any one embodiment described herein may be combined with the features of one or more other embodiments to form additional embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. An apparatus comprising: a controller to determine when the apparatus is to change from a computer mode to a tablet mode; a first storage area to store first page miss information; and a selectively enabled second storage area to store information based on different operational modes of the apparatus, wherein the second storage area is to receive the first page miss information from the first storage area and to store the first page miss information from the first storage area when the apparatus is determined to change from the computer mode to the tablet mode, wherein the apparatus is to be connected to a computer in the computer mode, and the apparatus is to be disconnected from the computer in the tablet mode, wherein the first page miss information is to be transferred from the second storage area to the first storage area when the apparatus is determined to change from the tablet mode to the computer mode, wherein the first storage area is located on a same chip or in a same package as the controller, and wherein the second storage area is not located on the same chip or in the same package as the controller and the first storage area.

2. The apparatus of claim 1, wherein the first page miss information is to be stored in a first range of locations in the first storage area and wherein the first range of locations corresponds to a victim buffer.

3. The apparatus of claim 2, wherein the first storage area has a second range of locations to store information different from the first page miss information and wherein the second range of locations does not include the first range of locations.

4. The apparatus of claim 1, further comprising:
   another storage area to store page miss information in a non-volatile memory,
   wherein the second storage area has a capacity greater than each of the first storage area and the another storage area.

5. The apparatus of claim 1, wherein:
   a capacity of the first storage area to store information different from the first page miss information is to be changed from a first capacity to a second capacity based on transfer of the first page-miss information to the second storage area, and
   the second capacity is greater than the first capacity.

6. The apparatus of claim 1, further comprising:
   another storage area,
   wherein page information is to be transferred from the second storage area to said another storage area when the apparatus is to change from the computer mode to the tablet mode.

7. The apparatus of claim 1,
   wherein the controller to control information transfers among the first storage area and the second storage area.

8. An electronic device comprising: a first storage area to store first information; a second storage area to store information based on different modes, the different modes including a computer mode and a tablet mode; and a controller to selectively enable the second storage area, wherein the second storage area is to store the first information from the first storage area when the device changes from the computer mode to the tablet mode, wherein the first information is to be transferred from the second storage area to the first storage area when the device changes from the tablet mode to the computer mode, wherein the device is to be connected to a computer in the computer mode, and the device is to be disconnected from the computer in the tablet mode, and wherein the first information is to include page miss information, wherein the first storage area is located on a same chip or in a same package as the controller, and the second storage area is not located on the same chip or in the same package as the controller and the first storage area.

9. The device of claim 8, wherein the second storage area is to be disabled by the controller in the tablet mode and enabled by the controller in the computer mode.

10. The device of claim 8, wherein the page miss information is to be stored in a first range of locations in the first storage area and wherein the first range of locations corresponds to a victim buffer.

11. The device of claim 10, wherein the first storage area has a second range of locations to store information different from the first information and wherein the second range of locations does not include the first range of locations.

12. The device of claim 8, further comprising:
a third storage area to store page information included in a non-volatile memory.

13. The device of claim 8, further comprising:
another storage area,
wherein page information is to be transferred from the second storage area to said another storage area when the device is to change from the computer mode to the tablet mode.

14. The device of claim 8, further comprising:
a selector to select address information from at least one of a first tag table and a second tag table, wherein:
the first tag table corresponds to the first storage area,
the second tag table corresponds to the second storage area,
the selector is to disable selection of address information from the second tag table when the device is in the tablet mode, and
the selector is to select address information from the first tag table and the second tag table when the device is in the computer mode.

15. The device of claim 8, wherein a capacity of the first storage area to store information different from the first information is to be changed from a first capacity to a second capacity based on transfer of the page-miss information to the second storage area, and wherein the second capacity is greater than the first capacity.

16. The device of claim 8, wherein the device is a tablet.

17. A non-transitory computer-readable medium to store instructions for controlling storage of information, the instructions comprising: first code to store first page miss information in a first storage area; and second code to selectively enable a second storage area to store information based on different operational modes, wherein the second storage area is to receive the first page miss information from the first storage area and to store the first page miss information from the first storage area when the second storage area is to change from a computer mode to a tablet mode, wherein the second storage area is to be connected to a computer in the computer mode, and the second storage area is to be disconnected from the computer in the tablet mode, wherein the first page miss information is to be transferred from the second storage area to the first storage area when the second storage area is to change from the tablet mode to the computer mode, wherein the first storage area is located on a same chip or in a same package as a controller, wherein the second storage area is not located on the same chip or in the same package as the controller and the first storage area.

18. The medium of claim 17, wherein the page miss information is to be stored in a first range of locations in the first storage area and wherein the first range of locations corresponds to a victim buffer.

* * * * *